Figure 1:
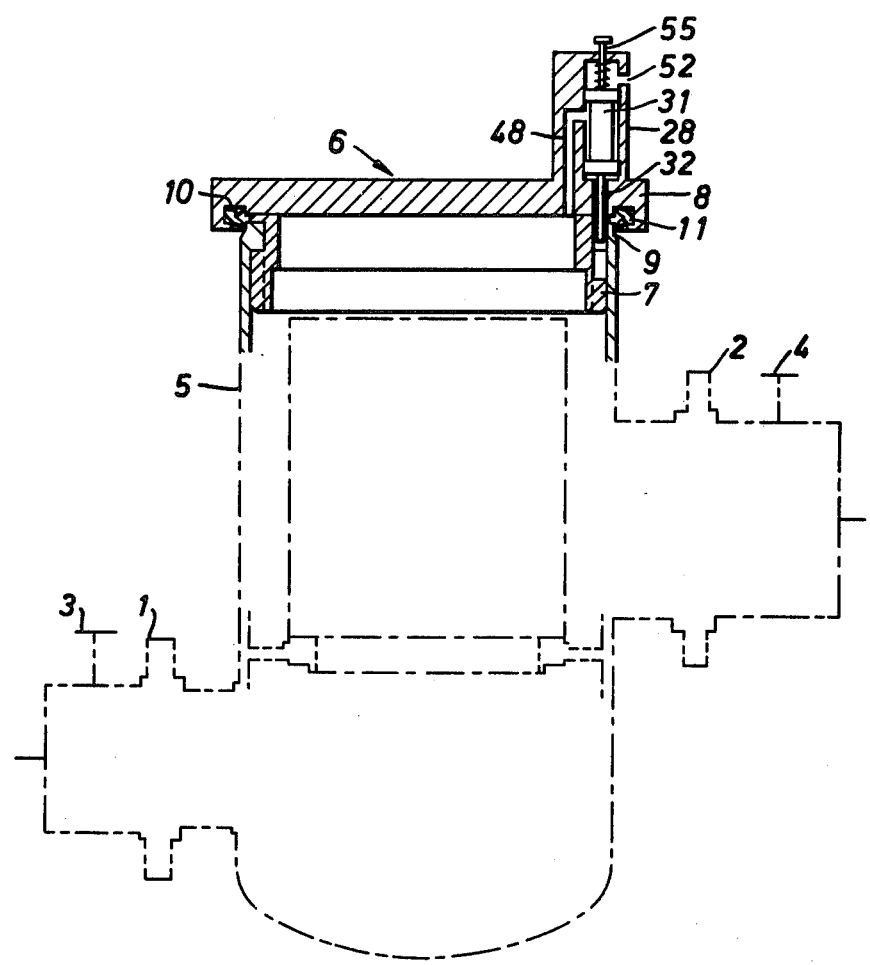

United States Patent [19]

Stoves et al.

[11] Patent Number: 4,465,202
[45] Date of Patent: Aug. 14, 1984

[54] FLUID CONTAINER WITH VENTING MEANS

[75] Inventors: Derek Stoves; John E. Hatley, both of Newcastle, England

[73] Assignee: British Gas Corporation, London, England

[21] Appl. No.: 422,031

[22] Filed: Sep. 23, 1982

[30] Foreign Application Priority Data

Sep. 23, 1981 [GB] United Kingdom ............... 8129234

[51] Int. Cl.³ .......................................... B65D 51/16
[52] U.S. Cl. ................................. 220/203; 220/316; 220/300; 220/303; 220/367
[58] Field of Search ............. 220/316, 202, 203, 208, 220/209, 300, 303, 361, 366

[56] References Cited

U.S. PATENT DOCUMENTS

| | | | |
|---|---|---|---|
| 2,692,066 | 10/1954 | Conrad | 220/316 |
| 2,727,761 | 12/1955 | Elliott et al. | 220/316 |
| 3,122,263 | 2/1964 | Guiver | 220/316 |
| 4,159,063 | 6/1979 | Weber et al. | 220/316 |
| 4,307,818 | 12/1981 | Singh et al. | 220/316 |
| 4,343,325 | 8/1982 | Fallon | 220/316 |

*Primary Examiner*—Joseph Man-Fu Moy
*Attorney, Agent, or Firm*—Larson and Taylor

[57] ABSTRACT

A sealable pressure vessel 5 has a closure member 8 held on by means of a bayonet fixing member which is movable between two positions while retaining the mechanical linkage between the vessel 5 and the closure member 8 forming a container 1. The bayonet fixing comprises a vessel lug 19 which co-operates with a stepped slot 18 in a locking ring 9 secured to the closure member. In one position of the lug 19 in the slot 18 the closure member is sealed on the vessel and the container is closed to atmosphere while in another position the seal is broken and the container is open to atmosphere. The closure member 8 incorporates a sliding valve 29 which has a spring urged piston 32 carrying a locking pin 33 to lock the lug 19 within the slot 18 when the container is closed to atmosphere. The piston 32 can vent the container to atmosphere when the closure member is sealed to the vessel if the piston 32 is raised since it then connects the interior of the container to atmosphere via a chamber 48 and two ports 49 and 51. Raising the piston 32 disengages the locking pin 33 from the lug 19 so that the closure member 8 can be removed from the vessel 5.

8 Claims, 4 Drawing Figures

U.S. Patent  Aug. 14, 1984  Sheet 3 of 3  4,465,202

FLUID CONTAINER WITH VENTING MEANS

This invention relates to fluid containers and, in particular, to fluid containers incorporating means for releasing the seal between the closure member and the vessel prior to freeing the closure member from the vessel.

Fluid transport systems, such as natural gas pipelines, incorporate many devices such as filters, cyclones, separators, etc. to which access is necessary for maintenance and the like. These devices are mounted in sealable containers with closure members which can be removed when desired. As an example, UK patent specification No. 1499058 discloses a filter pressure-reducer for incorporation in a compressed air pipeline, having a closure member mechanically demountably attached to the body of the device by means of a bayonet joint. Also mounted on the body of the device is a sliding locking device which prevents the closure member from being removed inadvertently.

A problem with devices of this type which hold fluids under pressure is that when the closure member is released, the fluid then, possibly explosively, forces the closure member from the container and it is therefore an object of the present invention to overcome this problem.

According to the present invention, there is provided a fluid container comprising a vessel and a removable closure member for mechanical linkage to the vessel to form a closure and seal therewith wherein the container is adapted to maintain the mechanical link between the closure member and the vessel while enabling the interior of the closed container either to be closed to atmosphere so that the seal between the closure member and the vessel can be made or to be open to atmosphere so that the seal is broken.

In one embodiment of the present invention, the mechanical link is movable between two positions respectively enabling the interior of the container to be closed or open to atmosphere.

In this case the mechanical link may comprise at least one bayonet fixing member, the or each member preferably comprising a lug co-operating with a slot in two displaced positions. In order to provide this ability, the slot may be stepped to provide two displaced positions for the lug.

Preferably the container includes a detent or detents adapted releasably to retain the or each lug in the slot in that position where the container is closed to atmosphere. Suitably the or each detent includes a valve which is operable to enable the interior of the container to be closed or open to atmosphere while the closure member is mechanically linked to the vessel. The or each valve may be a sliding valve which is movable between two positions respectively enabling the interior of the container to be closed or open to atmosphere. Conveniently, the or each sliding valve comprises a piston adapted to open or close a path between a first port communicating with the interior of the another embodiment of the invention, the container incorporates at least one valve which is operable to enable the interior of the container to be closed or open to atmosphere while the closure member is mechanically linked to the vessel. Preferably the or each valve is a sliding valve which is movable between two positions respectively enabling the interior of the container to be closed or open to atmosphere. Suitably the or each valve comprises a piston adapted to open or close a path between a first port communicating with an interior of the container and a second port communicating with the exterior of the container. Conveniently the or each valve is resiliently urged into a position in which the interior chamber of the container is closed to atmosphere.

The mechanical linkage between the closure member and the vessel may take the form of at least one bayonet fixing member, the or each member preferably comprising a lug co-operating with a slot in two displaced positions.

In order to provide this ability, the or each slot may be stepped to provide the two displaced positions for the or each lug.

Figure 2:
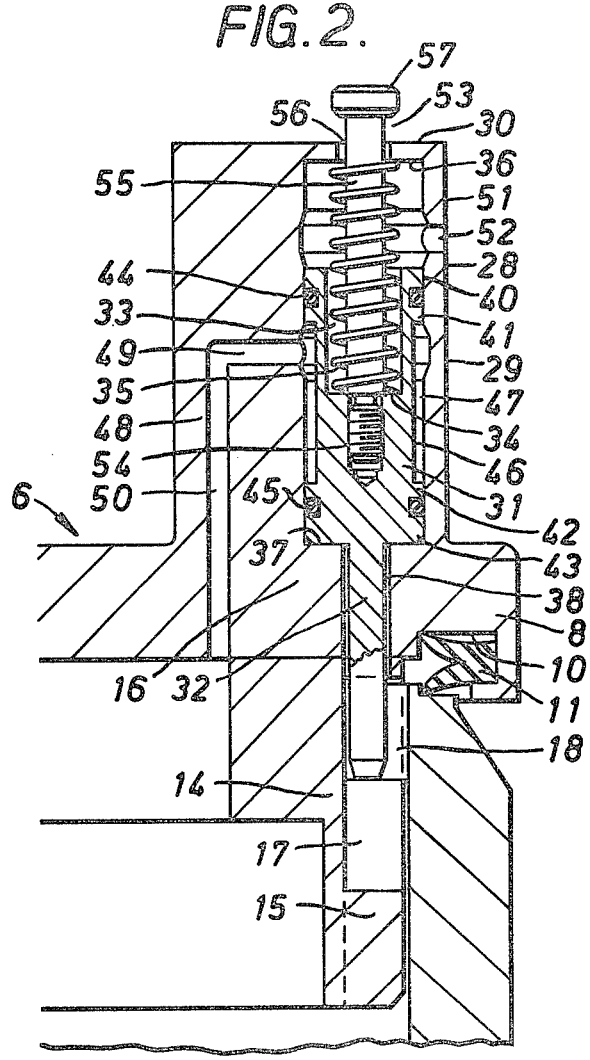
Figure 3:
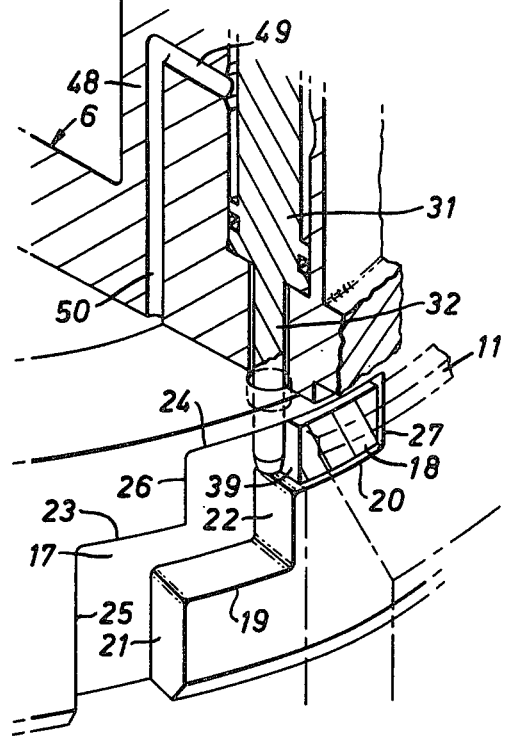
Figure 4:
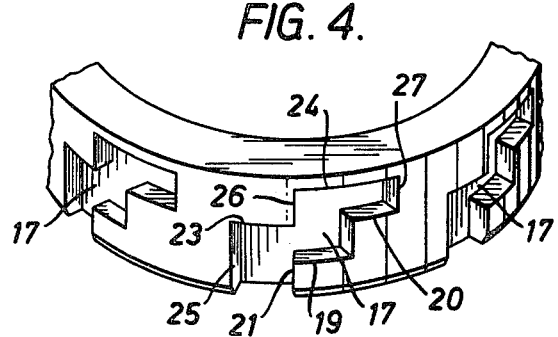

Embodiments of the invention will now be described by way of example with reference to the accompanying drawings in which:

FIG. 1 is a schematic drawing of a control valve for a gas pipeline mounted in a container shown in outline and incorporating the embodiments of the present invention, FIG. 2 is a sectional view of the embodiments shown in FIG. 1, FIG. 3 is partially cut away perspective view of the embodiments shown in FIGS. 1 and 2, and FIG. 4 is a perspective view of a stepped slot.

Referring to the drawings, FIG. 1 shows a gas pipeline having an inlet pipe 1 and an outlet pipe 2 connected by isolating valves 3, 4 to a pressure vessel 5.

The pressure vessel 5 serves as a container for a valve, filter or cyclone unit (not shown). Since the isolating valves 3, 4 form no part of the present invention they will not be described any further.

The pressure vessel 5 has a removable closure member 6 attached thereto by means of a locking ring 7.

The closure member 6 as shown in FIGS. 1 and 2 is formed with an outwardly directed flange 8 at its lower end for seating on the upper edge 9 of the vessel 5. The flange 8 of the closure member 6 is provided with an underlying circumferential recess 10 which houses a sealing ring 11 or a suitable elastomeric material such as neoprene or the like, the ring 11 in use resting upon the upper edge 9 of the vessel 5.

The closure member 6 is in the form of a circular plate and can incorporate a cartridge valve depending from the lower part thereof into the vessel or the cartridge valve can form the closure member.

The locking ring 7 has a lower portion 14 having a lower part 15 which extends radially outwardly and is welded to the vertical wall 16 of the closure member 6.

As shown in FIGS. 2 and 4 a stepped slot 17 is formed in the outer lower part 15 of the locking ring 7 so as to form with a square lug 18 projecting radially inwardly from the upper end of the vessel 5 a bayonet-fixing member and a two-position mechanical linkage for the closure member 6 and the vessel 5. The slot 17 is formed between adjoining stepped surfaces in the locking ring 7. The lower surface comprises two horizontal steps 19 and 20 adjoining two vertical surfaces 21 and 22 respectively. The upper surface comprises two horizontal steps 23 and 24 adjoining two vertical surfaces 25 and 26 respectively. In use the lug 18 may rest upon the steps 19 and 20. When resting on the lower step 19 the seal between the closure member 6 and the vessel 5 is broken and the interior of the container is open to atmosphere. The lug 18 may also in use rest on the upper step 20 and at this point the closure member 6 is fully closed on the vessel 5 so that a seal can be formed between the closure member 6 and the vessel 5 with the container now being closed to atmosphere.

The surfaces 21 and 25 form a lug entry passage at the lower end of the locking ring 7 while the slot 17 is closed by a vertical surface 27 adjoining the horizontal surfaces 20 and 24. The lug 18 is so fashioned that it rests between surfaces 20 and 24 when pushed against the surface 27 as shown in FIG. 3. As shown in FIG. 4 the locking ring 9 may be provided with several such slots 17 and the vessel 5 may be provided with an equal number of corresponding lugs 18.

Mounted on the closure member is a valve 28 which comprises a cylinder 29 formed between the vertical wall 16 and the flange 8 of the closure member 6 and an extension 30 to the wall 16 and the flange 8. The cylinder 29 so formed houses a cylindrical piston-like plunger 31 which is slidably received within the cylinder, and from which extends a cylindrical locking pin 32 acting as a detent to lock the lug 18 into position on the upper slot step 20 as shown in FIG. 3. There may be a number of such valves 28 and locking pins 32 corresponding to the number of lugs 18 and slots 17.

The plunger 31 is provided at its upper end with a cylindrical recess 33 having an end 34 upon which rests the lower end of a coil spring 35. The upper end of the coil spring 35 bears against the upper wall 36 of the cylinder 30 and, in use, is adapted to urge the plunger 31 downwards so that its lower shoulders 37 are urged against the upper surface of the flange 8. In this position the locking pin 32 extends through an aperture 38 in the flange 8 and terminates at a point just above the step surface 20. If the closure member 6 is fully closed upon the vessel 5, the lug 18 is in the position shown in FIG. 3 and the locking pin 32 engages a rearward wall 39 of the lug 18 to lock it in position. This is effective to prevent inadvertent rotation of the closure member 6 when in the fully closed position on the vessel 5.

The plunger 31 is provided with two pairs of annular peripheral ribs 40, 41 and 42, 43 at either of its ends, a recess being formed between each pair of ribs to accommodate respectively O-rings 44 and 45 of a suitable resilient material such as nitrile rubber. The O-ring 44, 45 make a gas tight seal between the plunger 31 and the cylinder 29. The central section 46 of the plunger 31 is of smaller diameter than the outer sections so that a sealed annular chamber 47 is formed between the O-rings 44 and 45. The closure member 6 is formed with a vent port 48 enabling the cylinder 29 to communicate with the interior of the vessel. Vent port 48 has a horizontal part 49 communicating with the cylinder 29 and a vertical part 50 communicating with the interior of the vessel. The vertical wall 51 of the cylinder 29 is also provided with a vent port 52 vertically displaced from port 49 to enable the cylinder 29 to communicate with atmosphere.

In the locked or closed position shown in the Figures the ports 48 and 52 are isolated from each other by the seal formed by the upper O-ring 44. However, in the unlocked or open position the vent ports 48 and 52 are able to communicate with each other by way of the chamber 47. In this case the detent plunger 31 is raised vertically upwards against the action of the spring 35 until the two vent ports 48 and 52 both lie between the O-rings 44 and 45 whereby the ports 48 and 52 will be communicating with each other by way of the chamber 47.

To enable the plunger 31 to be raised, it is provided with an actuating pin 53 having a threaded end 54 screwed into a bore in the end of the recess 33 and a body 55 extending through an aperture 56 in the upper wall 36 of the cylinder 29. The spring 35 circumvents the body 55 of the pin 55 which has a head 57 located outside the cylinder 29 to enable th pin 53 to be manually gripped for actuation. While not shown there may be several valves 28 indeed one for every slot or one for every pressurised chamber where there are separable chambers in the vessel although only one valve 28 is necessary to lock the closure member 6 in position on the vessel 5.

To position and seal the closure member 6 upon the vessel 5, the locking pin 32 is raised by raising the plunger 31. The member 6 together with its locking ring 8 and sealing ring 11 is placed like a lid on the vessel 5 so that the lug 18 (or lugs) are caused to enter the entry passage(s) of the slot 17 (or slots) to engage the horizontal surface 23 of the slot 17. The closure member 6 is then suitably rotated and then pushed to cause lug 18 to meet the face 24 and finally rotated again until the lug 18 occupies the position shown in FIG. 3 and seats on the surface 20 of the slot 17. The closure member 6 is then sealed to the vessel 5 and the plunger 31 is lowered so that the locking pin 32 engages the wall 39 of the lug 18 to lock the closure member 6 and prevent its inadvertent rotation on the vessel 5.

To free the closure member 6 the actuating pin 53 of the detent plunger 31 is raised until the ports 48 and 52 communicate with each other via the chamber 47. This thereby enables the pressure in the vessel to be vented to atmosphere.

The closure member 6 is then rotated to its second partially closed position where the lug 18 abuts the face 26 and is then lifted such that lug 18 abuts surfaces 19 and 22 but the closure member 6 and the vessel 5 are still mechanically linked. The closure member 6 is then rotated until the lug 18 meets the face 25 and is then withdrawn from the slot 17.

The incorporation of either the lug/stepped slot linkage or of the valve assembly into the container will enable the closure member to be removed from the vessel with minimum risk of the member being forced off by the pressure of the fluid within the container. This is because either device will enable the pressure within the container to be vented while the closure member is still mechanically linked to the vessel. While the container shown in the drawings incorporates both devices, it will be appreciated that either the lug/stepped slot assembly or the valve assembly with a simple bayonet fixing system would provide an improvement in safety. For complete safety however, it is advised that both devices are incorporated into the fluid container. This ensures that the pressures are vented on releasing the detents and should any pressure remain then the stepped lug/slot arrangement will ensure it is automatically vented on rotating to remove the cover prior to mechanically releasing the cover. In order to facilitate disengagement of the closure member, the mating surfaces of the lugs and slots may be tapering rather than perpendicular to the direction of movement for release.

We claim:

1. A fluid container comprising a vessel, removable closure member and mechanical linkage means for mechanically linking the closure member to the vessel to provide a closure for, said mechanical linkage means comprising a bayonet fixing means for providing the mechanical linkage between the vessel and the closure member and including at least one lug cooperating with a corresponding slot and at least one valve means, operable to enable the interior of the container to be closed or open to atmosphere while the closure member is mechanically linked to the vessel, for providing a detent for releasably retaining the at least one lug in the slot when the container is closed to atmosphere in such a manner that the closure member is incapable of being removed from the vessel until the at least one lug is released from retention by the detent provided by the valve means.

2. A fluid container as claimed in claim 1, in which the at least one lug cooperates with said corresponding slot in two displaced positions.

3. A fluid container as claimed in claim 2 in which said corresponding slot is stepped to provide the two displaced positions for the respective lug cooperating therewith.

4. A fluid container as claimed in claim 1 in which the at least one valve means comprises a sliding valve movable between two positions which respectively enable the interior of the container to be closed to atmosphere or open to atmosphere.

5. A fluid container as claimed in claim 4 in which the sliding valve comprises a piston for opening a path between a first port communicating with the interior of the container and a second port communicating with the exterior of the container.

6. A fluid container as claimed in claim 5 in which said piston includes a locking pin attached thereto and acting as said detent.

7. A fluid container as claimed in claim 1 further comprising means for resiliently urging the at least one valve into a position in which the interior of the container is closed to atmosphere.

8. A fluid container as claimed in claim 1 further comprising means for resiliently urging the detent formed by said valve means into engagement with the corresponding lug retained thereby.

* * * * *